United States Patent
Nakamura

(10) Patent No.: US 7,388,763 B2
(45) Date of Patent: Jun. 17, 2008

(54) SWITCHING POWER SUPPLY

(75) Inventor: Masaru Nakamura, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 121 days.

(21) Appl. No.: 11/367,337

(22) Filed: Mar. 6, 2006

(65) Prior Publication Data
US 2006/0198167 A1 Sep. 7, 2006

(30) Foreign Application Priority Data
Mar. 7, 2005 (JP) ............... 2005-062932

(51) Int. Cl.
H02M 3/335 (2006.01)
(52) U.S. Cl. ............... 363/21.15; 363/21.18; 363/97
(58) Field of Classification Search ........... 363/20, 363/21.01, 21.04, 21.07, 21.09, 21.1, 21.11, 363/21.12, 21.15, 21.17, 21.18, 97, 131, 363/15, 16
See application file for complete search history.

(56) References Cited

U.S. PATENT DOCUMENTS 6,061,257 A * 5/2000 Spampinato et al. .... 363/21.13
6,396,718 B1 * 5/2002 Ng et al. ............... 363/21.07
7,116,564 B2 * 10/2006 Takahashi ............... 363/21.16
2005/0078492 A1 * 4/2005 Takahashi ............... 363/21.15
2005/0162873 A1 * 7/2005 Boswinkel ............... 363/20

FOREIGN PATENT DOCUMENTS

JP 5-137327 6/1993

* cited by examiner

Primary Examiner—Jeffrey L. Sterrett
Assistant Examiner—Stuart Hansen
(74) Attorney, Agent, or Firm—Oblon, Spivak, McClelland, Maier & Neustadt, P.C.

(57) ABSTRACT

A switching power supply of the present invention comprises: a switching element through which a DC voltage is supplied via a primary winding; an output voltage detection circuit detecting a voltage of a secondary winding to generate an error signal; a regulator generating a predetermined voltage based on a voltage generated at a node between the switching element and the primary winding; a photocoupler through which a feedback current signal corresponding to the error signal passes; a feedback current detection circuit detecting a feedback current signal; a feedback voltage generation circuit generating a feedback voltage according to the current of the feedback current detection circuit when the switching element is OFF and holding the generated feedback voltage when the switching element is ON; and a control circuit controlling ON/OFF duty of the switching element according to an increase or decrease of the feedback voltage.

6 Claims, 4 Drawing Sheets

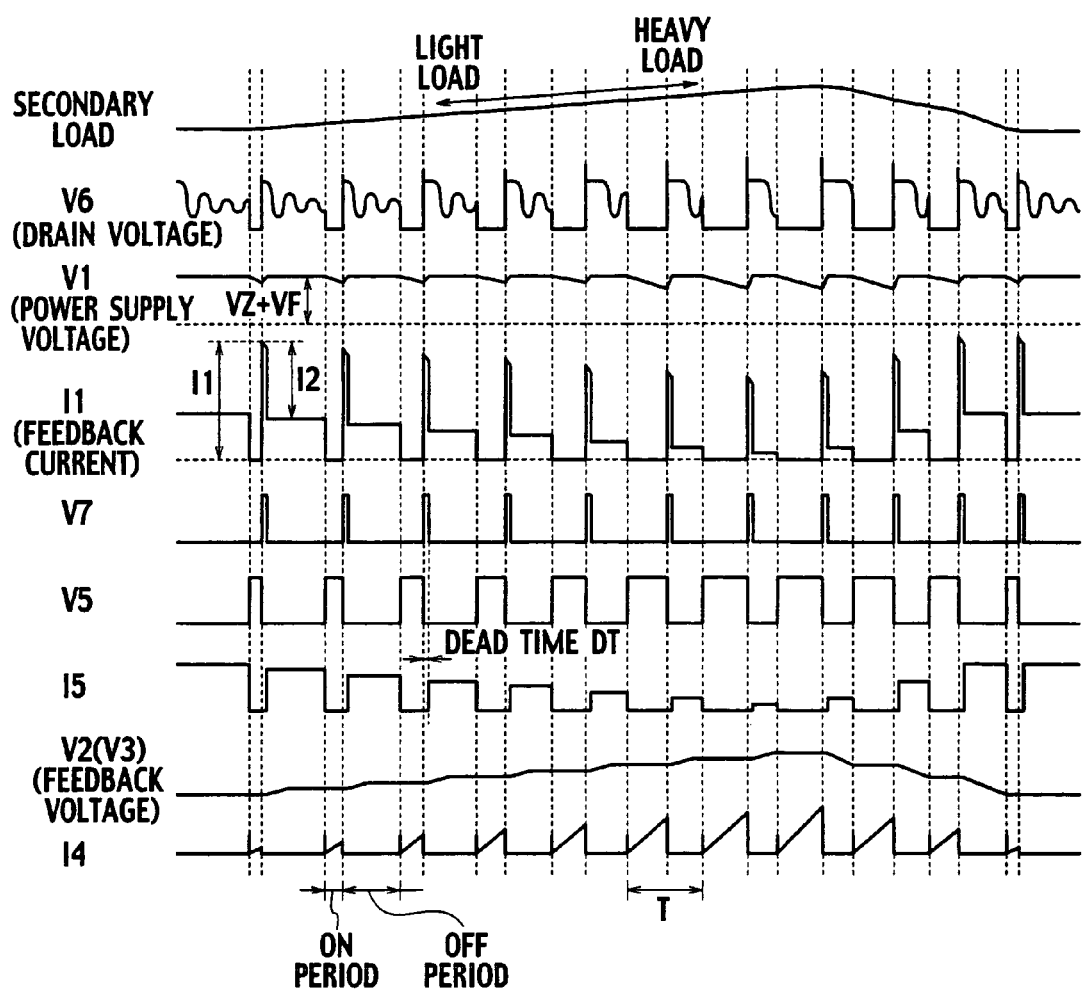

US 7,388,763 B2

SWITCHING POWER SUPPLY

BACKGROUND OF THE INVENTION

The present invention relates to a switching power supply, and more specifically, relates to a technique for reducing the size of the switching power supply.

Conventionally, a semiconductor integrated circuit for the switching power supply has been developed, in which a power terminal and a feedback terminal are made common to reduce the number of terminals, thereby realizing a small size of an external shape of a package and reduction of external parts. The switching power supply constructed by using the semiconductor integrated circuit is disclosed in, for example, Japanese Patent Application Laid-Open No. H5-137327. FIG. 1 is a block diagram of a configuration of a conventional switching power supply.

The switching power supply includes a transformer 10, a control circuit 200 connected to a primary winding 20 of the transformer 10, a rectifying and smoothing circuit 270 connected to a drive winding (tertiary winding) 210 of the transformer 10, a photo transistor 110a connected to an output side of the rectifying and smoothing circuit 270, a rectifying and smoothing circuit 170 connected to a secondary winding 30 of the transformer 10, an output voltage detection circuit 180 connected to an output side of the rectifying and smoothing circuit 170 and including a photo diode 110b, a load 190, and a capacitor 100 for stabilizing a supply voltage, which is connected to a power terminal (to be commonly used as the feedback terminal) of the control circuit 200.

The photo transistor 110a is optically coupled with the photo diode 110b to form a photocoupler 110.

The control circuit 200 is formed of a semiconductor integrated circuit, and connected to the primary winding 20 of the transformer 10, to which a DC voltage is inputted. The control circuit 200 includes a switching element 220, an activation circuit 230, a PWM control circuit 240, a detection resistor 250, a detection resistor 260, and a start circuit 280.

The activation circuit 230 supplies a constant current bias temporarily to the PWM control circuit 240, immediately after power on. The supply of the bias current by the activation circuit 230 is intercepted after sufficient energy is supplied to the power terminal from the rectifying and smoothing circuit 270 connected to the drive winding 210.

When the voltage of the power terminal rises due to the supply of bias from the activation circuit 230 to reach a predetermined value, the start circuit 280 activates the PWM control circuit 240. As a result, a pulse of voltage is outputted from the drive winding 210, and the pulse of voltage is rectified and stabilized by the rectifying and smoothing circuit 270. The output of the rectifying and smoothing circuit 270 is supplied to the capacitor 100 for stabilizing the power supply via the photo transistor 110a. Accordingly, the supply voltage V100 is supplied to the PWM control circuit 240.

A signal fed back from the output voltage detection circuit 180 on the secondary side via the photocoupler 110 is superimposed on the supply voltage V100, so as to control the voltage such that the voltage rises under a light load condition, and drops under a heavy load condition. A voltage obtained through resistive potential division of the supply voltage V100 by the detection resistor 250 and the detection resistor 260 is supplied to the PWM control circuit 240, and hence, the PWM control circuit 240 controls an on duty width of the switching element 220. As a result, a constant voltage is outputted from the rectifying and smoothing circuit 170 on the secondary side.

The semiconductor integrated circuit constituting the control circuit 200 can reduce the number of control terminals to 3 by integrating the power terminal and the feedback terminal, thereby enabling installation thereof in a small package for a power transistor. Accordingly, the semiconductor integrated circuit is particularly used for a small switching power supply such as a charger for a mobile phone.

SUMMARY OF THE INVENTION

However, with the progress of recent technology, miniaturizations of various kinds of apparatus are accelerated, and it is required to further reduce the size and the cost of the switching power supply.

According to the present invention, a switching power supply that can reduce the size and the cost can be provided.

According to the technical aspect of the present invention, a switching power supply comprising: a switching element being connected to one end of a primary winding of a transformer, an input DC voltage being supplied to a secondary winding of the transformer via the primary winding; an output voltage detection circuit detecting a voltage obtained by rectifying and smoothing a voltage of the secondary winding of the transformer, and generating an error signal between the detected voltage and a reference voltage; a regulator generating a predetermined voltage based on a voltage generated at a node between the switching element and the primary winding of the transformer; a capacitor being connected to an output of the regulator for stabilizing an output voltage of the regulator; a photocoupler being connected to the capacitor in parallel wherein a feedback current signal corresponding to the error signal passes through the photocoupler; a feedback current detection circuit outputting electric current corresponding to the feedback current signal that passes through the photocoupler; a feedback voltage generation circuit generating a feedback voltage according to the current outputted from the feedback current detection circuit in a case where the switching element is OFF, and holding the generated feedback voltage in a case where the switching element is ON; and a control circuit controlling ON/OFF duty of the switching element according to the feedback voltage outputted from the feedback voltage generation circuit.

BRIEF DESCRIPTION OF THE DRAWINGS

FIG. 5 is a timing chart of an operation of the switching power supply according to the embodiment of the present invention.

DESCRIPTION OF THE PREFERRED EMBODIMENTS

An embodiment of the present invention will be explained below in detail with reference to the drawings.

Figure 1:
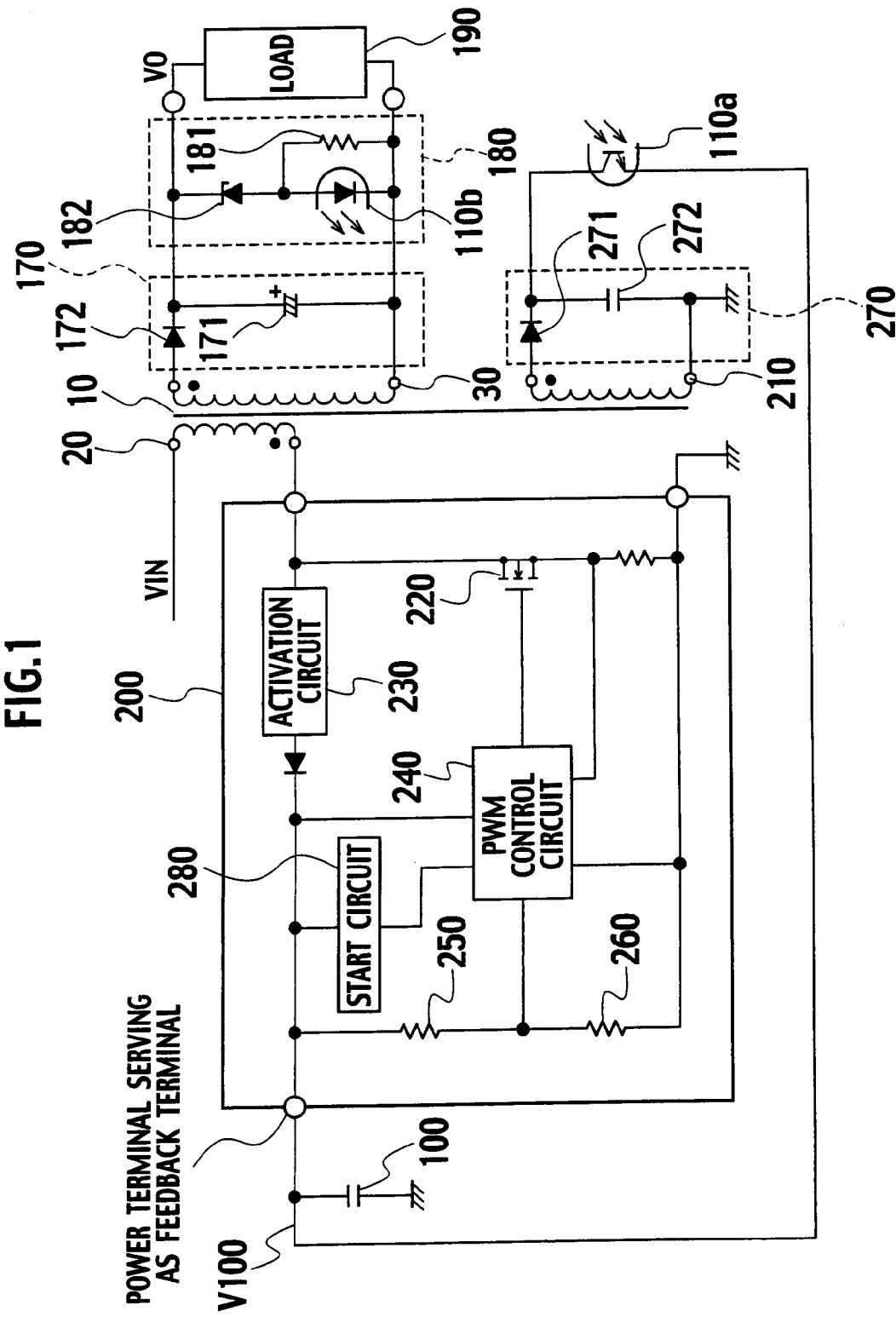
FIG. 1 shows a configuration of a conventional switching power supply.
Figure 2:
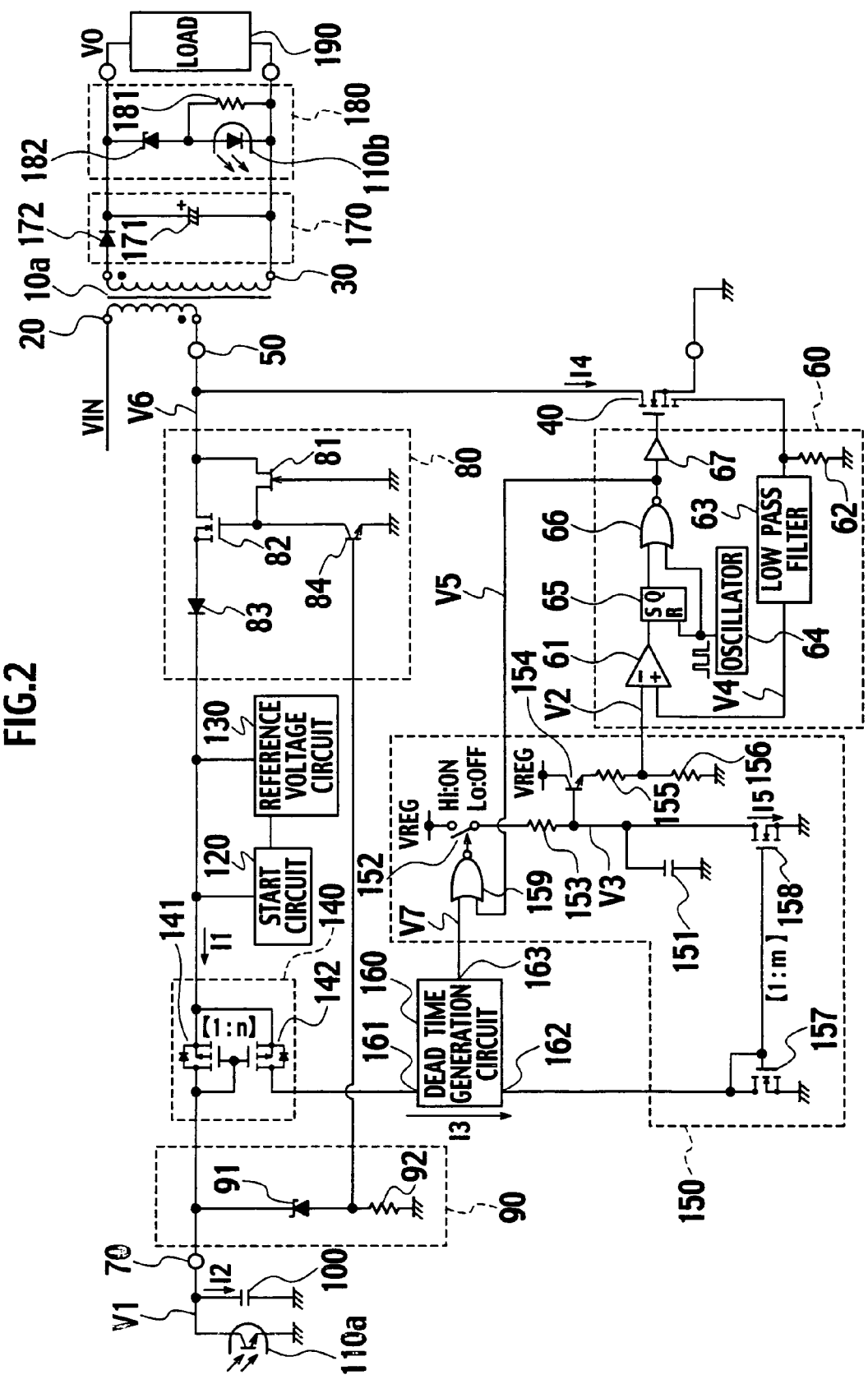
FIG. 2 shows a configuration of a switching power supply according to an embodiment of the present invention.

FIG. 2 shows a configuration of a switching power supply according to an embodiment of the present invention. Like reference numerals will be used to refer to like parts or corresponding parts in the conventional switching power supply shown in FIG. 1.

The switching power supply includes a primary circuit connected to a primary winding 20 of a transformer 10a, and a secondary circuit connected to a secondary winding 30 of the transformer 10a. The transformer 10a transmits energy of the primary circuit to the secondary circuit.

A DC voltage VIN is supplied to one end of the primary winding 20 of the transformer 10a. A drain terminal 50 is provided at the other end of the primary winding 20, and a drain of an N-type MOSFET 40 as a switching element for driving the primary winding 20 is serially connected thereto via the drain terminal 50.

A regulator 80 for generating a supply voltage V1 for the primary circuit is directly connected to the drain terminal 50. The regulator 80 includes, as shown in FIG. 2, a junction FET (JFET) 81, a n-type MOSFET 82, a diode 83, and a npn transistor 84.

The drain of the JFET 81 is connected to the drain terminal 50 and the drain of the n-type MOSFET 82, and a gate of the JFET 81 is grounded. A source of the n-type MOSFET 82 is connected to an anode of the diode 83, and a cathode of the diode 83 is connected to a feedback current detection circuit 140, a start circuit 120, and a reference voltage circuit 130. The gate of the n-type MOSFET 82 and the source of the JFET 81 are connected to a collector of the npn transistor 84, and an emitter of the npn transistor 84 is grounded.

A power terminal 70 also serving as a feedback terminal is provided to the primary circuit. A supply voltage detection circuit 90 for detecting the supply voltage V1, a capacitor 100 for stabilizing the supply voltage V1, and a photo transistor 110a for receiving the feedback voltage from the secondary circuit are connected to the power terminal 70. The supply voltage detection circuit 90 is formed of a Zener diode 91 serially connected between the power terminal 70 and a ground, and a resistor 92. A signal of the node between the Zener diode 91 and the resistor 92 is fed back to a base of the npn transistor 84 in the regulator 80, to control an output of the regulator 80.

The feedback current detection circuit 140 for detecting a feedback current I1 flowing from the regulator 80 to the photo transistor 110a is provided between an output terminal of the regulator 80 and the power terminal 70. The feedback current detection circuit 140 includes a current mirror circuit for detecting the feedback current I1 at a predetermined ratio (1:n), and the current mirror circuit is formed of a p-type MOSFET 141 and a p-type MOSFET 142. The p-type MOSFET 141 allows the feedback current I1 to pass through, and the p-type MOSFET 142 generates a current signal I3 proportional to the feedback current I1 and transmits the current signal I3 to an input terminal 161 of a dead time generation circuit 160.

The start circuit 120 for starting an operation of the switching power supply when the supply voltage V1 reaches the predetermined value or higher is connected between the output terminal of the regulator 80 and the feedback current detection circuit 140. The reference voltage circuit 130 that supplies power to the respective blocks on the primary side by activating the start circuit 120 is connected between the output terminal of the regulator 80 and the feedback current detection circuit 140.

The p-type MOSFET 142 forming the feedback current detection circuit 140 is connected to a feedback voltage generation circuit 150 via the dead time generation circuit 160. The feedback voltage generation circuit 150 generates a feedback voltage signal V2 corresponding to the current signal I3 output from the feedback current detection circuit 140 and supplies the feedback voltage signal V2 to a PWM control circuit 60.

The feedback voltage generation circuit. 150 includes a feedback capacitor 151, a switch 152, a resistor 153, an npn transistor 154, a resistor 155, a resistor 156, an n-type MOSFET 157, an n-type MOSFET 158, and an NOR circuit 159. One end of the switch 152 is connected to a reference voltage VREG, and the other end is connected to the drain of the n-type MOSFET 158 via the resistor 153. The switch 152 turns on/off according to an output of the NOR circuit 159.

The NOR circuit 159 outputs a high level signal when a voltage signal V5 supplied from the PWN control circuit 60 to the gate of the switching element 40 is low level and the voltage output from a second output terminal 163 of the dead time generation circuit 160 is also low level, or outputs a low level signal in other occasions. Therefore, the switch 152 is turned on, only when, during the period in which the switching element 40 is OFF, a signal indicating that it is not dead time is output from the dead time generation circuit 160.

The n-type MOSFET 157 and the n-type MOSFET 158 are mirror-connected, so that a current having the predetermined ratio (1:m) with respect to the current flowing in the n-type MOSFET 157 is allowed to flow to the n-type MOSFET 158. The drain of the n-type MOSFET 157 is connected to a first output terminal 162 of the dead time generation circuit 160, the source thereof is grounded, and the gate thereof is connected to the drain and the gate of the n-type MOSFET 158. The drain of the n-type MOSFET 158 is connected to the resistor 153, the source thereof is grounded, and the gate thereof is connected to the gate of the n-type MOSFET 157.

The feedback capacitor 151 provided between the node of the resistor 153 and the drain of the n-type MOSFET 158 and the ground is used for holding the feedback voltage signal V2 to be supplied to the PWN control circuit 60 during the period in which the switching element 40 is ON.

A series circuit formed of the npn transistor 154, and the resistors 155 and 156 is provided between the reference power supply VREG and the ground. The base of the npn transistor 154 is connected to the node of the resistor 153 and the drain of the n-type MOSFET 158. When the voltage V3 at the node reaches the predetermined value or higher, the npn transistor 154 is turned ON, and the voltage obtained through resistive division by the resistors 155 and 156 is supplied to the PWM control circuit 60 as the feedback voltage signal V2.

When the switching element 40 is switched from ON to OFF, the dead time generation circuit 160 generates the dead time for interrupting the current signal I3 transmitted from the feedback current detection circuit 140 to the feedback voltage generation circuit 150, while a peak current I2 is flowing so as to charge the capacitor 100. The dead time generation circuit 160 will be explained later in detail.

The PWM control circuit 60 for controlling ON/OFF of the switching element 40 is connected to the gate of the switching element 40. The PWM control circuit 60 includes a comparator 61, a resistor 62, a low pass filter 63, an oscillator 64, an SR latch 65, an NOR gate circuit 66, and a buffer circuit 67.

The low pass filter 63 outputs a voltage signal obtained by extracting only a low frequency included in the voltage generated from the current flowing from the switching element 40 to the resistor 62. The comparator 61 inputs the voltage from the low pass filter 63 to a non-inverting input terminal (+), inputs a voltage obtained through resistive division by the resistors 155 and 156 to an inverting input terminal (−), and outputs H level only when the voltage of the non-inverting input terminal (+) is larger than the voltage of the inverting input terminal (−). The SR latch 65 inputs an output of the comparator 61 to a set terminal S, inputs a clock signal from the oscillator 64 to a reset terminal R, and outputs from an output terminal Q. The NOR gate 66 performs NOR operation of the clock signal from the oscillator 64 and the output from the SR latch 65. The buffer circuit 67 outputs the output from the NOR gate 66 to the gate of the switching element 40.

A rectifying and smoothing circuit 170 formed of a capacitor 171 and a diode 172 is connected to the secondary winding 30 of the transformer 10*a* in the secondary circuit. The rectifying and smoothing circuit 170 rectifies and smoothes the pulse of voltage generated in the secondary winding 30 of the transformer 10*a*. An output voltage detection circuit 180 and a load 190 are connected to the output side of the rectifying and smoothing circuit 170. The output voltage detection circuit 180 includes a resistor 181 and a Zener diode 182, which are serially connected, and the photo diode 110*b* provided in parallel with the resistor 181.

The output voltage detection circuit 180 detects an output voltage VO output from the rectifying and smoothing circuit 170, and transmits an error signal to the primary circuit via the photo diode 110*b*. A photocoupler 110 is formed of the photo transistor 110*a* on the primary circuit and the photo transistor 110*b* on the secondary circuit.

Figure 3:
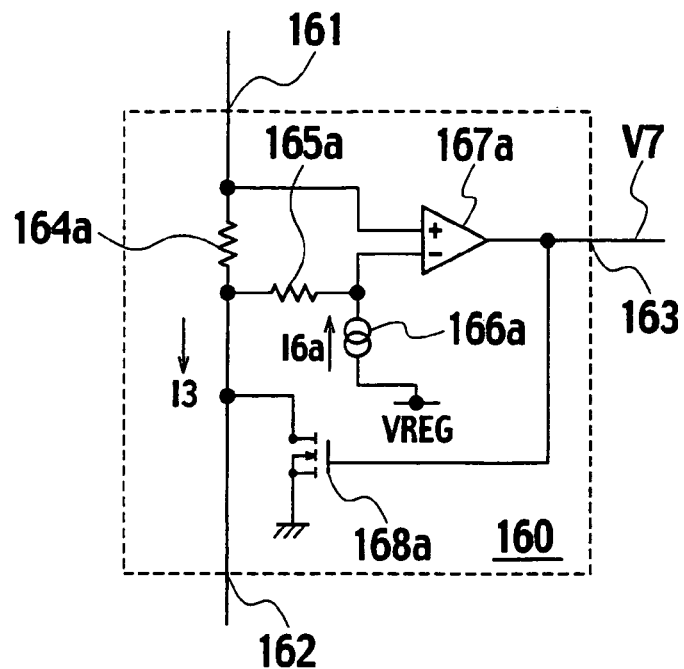
FIG. 3 is a detailed circuit diagram of a first configuration example of a dead time generation circuit shown in FIG. 2.

The configuration of the dead time generation circuit 160 is explained in detail. FIG. 3 is a detailed circuit diagram of a first configuration example of the dead time generation circuit 160. The dead time generation circuit 160 includes a current detection resistor 164*a*, whose one end is connected to the input terminal 161 for inputting the current signal I3 from the feedback current detection circuit 140 and the other end is connected to the first output terminal 162. One end of the current detection resistor 164*a* is connected to the non-inverting input terminal (+) of a comparator 167*a*, and the other end is connected to the inverting input terminal (−) of the comparator 167*a* via the resistor 165*a*for generating an offset voltage. A constant current source 166*a*for generating the offset voltage is connected to the inverting input terminal (−) of the comparator 167*a*.

A voltage V7 outputted from the comparator 167*a* is supplied to the feedback voltage generation circuit 150 via the second output terminal 163. The gate of the n-type MOSFET 168*a* is connected to the output terminal of the comparator 167*a*, the source thereof is grounded, and the drain thereof is connected to the first output terminal 162. The n-type MOSFET 168*a* is turned ON during the dead time period to intercept the current signal transmitted from the first output terminal 162 to the feedback voltage generation circuit 150.

In the dead time generation circuit 160, a constant current I6*a* flows from the constant current source 166*a* to the ground via the resistor 165*a* and the first output terminal 162. As a result, a predetermined voltage is generated in the inverting input terminal (−) of the comparator 167*a* and serves as an offset voltage.

The current signal I3 in proportion to the peak current flowing for charging the capacitor 100 at the time of switching the switching element 40 from ON to OFF flows from the input terminal 161 to the first output terminal 162.

When the voltage generated at the resistor 164*a* by the current signal I3 is lower than the offset voltage, the output of the comparator 167*a* becomes L level. However, when the voltage generated in the resistor 164*a* exceeds the offset voltage, the output becomes H level, and it is detected that the current flowing from the input terminal 161 to the first output terminal 162 exceeds the predetermined current. As a result, since the n-type MOSFET 168*a* is turned on, it is prevented that the peak current flows to the feedback voltage generation circuit 150.

Figure 4:
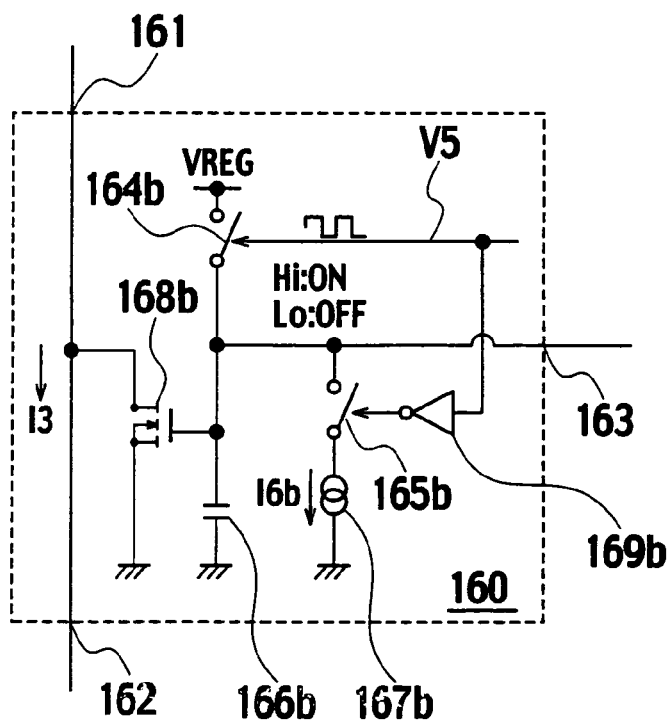
FIG. 4 is a detailed circuit diagram of a second configuration example of the dead time generation circuit shown in FIG. 2.

FIG. 4 is a detailed circuit diagram of a second configuration example of the dead time generation circuit 160. In the dead time generation circuit 160, a series circuit formed of the switch 164*b*and the capacitor 166*b* for generating the dead time is connected between the reference power supply VREG and the ground.

A series circuit formed of the switch 165*b* and the constant current source 167*b* for discharging the charge is connected to the capacitor 166*b* in parallel. An n-type MOSFET 168*b* whose drain is connected to the input terminal 161 is provided, the source thereof is grounded, and the gate thereof is connected to the node between the switch 164*b* and the capacitor 166*b*. The n-type MOSFET 168*b*is turned on during the dead time period to intercept the current signal supplied to the feedback voltage generation circuit 150.

The switch 164*b* is opened or closed according to the voltage signal V5 supplied from the PWM control circuit 60 to the gate of the switching element 40, and the switch 165*b* is opened or closed according to a signal obtained by inverting the voltage signal V5 by an inverter circuit 169*b*. Therefore, the switches 164*b* and 165*b*are exclusively opened or closed, and the switch 164*b* is turned on when the voltage signal V5 is H level, and is turned off when the voltage signal V5 is L level. The voltage V7 at the node between the switch 164*b* and the capacitor 166*b* is supplied to the feedback voltage generation circuit 150 via the second output terminal 163.

The dead time generation circuit 160 charges the capacitor 166*b* by turning the switch 164*b* on when the switching element 40 is switched on, and when the switching element 40 is switched off, turns the switch 165*b* on, so that the capacitor 166*b* discharges by the constant current source 167*b*, thereby setting the period until the n-type MOSFET 168*b* is turned off as the dead time. Accordingly, it is prevented that the peak current flows to the feedback voltage generation circuit 150.

An operation of the switching power supply according to the embodiment of the present invention is explained with reference to a timing chart shown in FIG. 5. In FIG. 5, a cycle T of an On/Off period of the switching element 40 is a constant value.

After the input voltage VIN is applied by turning the power on, a both terminal voltage V1 of a capacitor 100 rises due to the current supply from the regulator 80. When the both terminal voltage V1 of the capacitor 100 reaches a threshold voltage determined in the start circuit 120, the reference voltage circuit 130 supplies the power to the respective blocks. Accordingly, the switching element 40 starts the switching operation.

During the ON period of the switching element 40, the drain current I4 linearly increases with the lapse of time, and a drain voltage V6 becomes substantially zero. Therefore, since the regulator 80 does not operate, the feedback current does not pass through the photocoupler 110. At this time, the feedback current is not inputted to the input terminal 161 of the dead time generation circuit 160, the voltage V7 as the output of the dead time generation circuit 160 becomes L level, and the output of the NOR circuit 159 becomes low (L) level. At this time, the switch 152 is turned Off, and the comparator 61 outputs L level when the feedback voltage V2 generated from the voltage V3 accumulated in the feedback capacitor 151 is higher than the voltage input to the non-inverting input terminal (+) of the comparator 61. Since the NOR gate circuit 66 outputs high (H) level to the gate of the switching element 40 via the buffer circuit 67 due to the L level from the SR latch 65 and the L level from the oscillator 64, the switching element 40 maintains the ON condition.

The peak value of the drain current I4 during the ON period of the switching element 40 is generated in the OFF period in the previous cycle T based on the voltage V3 accumulated in the feedback capacitor 151. The peak value is in proportion to the feedback voltage signal V2 supplied to the inverting input terminal (−) of the comparator 61 and the drain current I4 of the switching element 40, and determined by the voltage V4 supplied to the non-inverting input terminal (+) of the comparator 61. The voltage proportional to the drain current I4 is supplied to the non-inverting input terminal (+) of the comparator 61 via the resistor 62 and the low-pass filter 63.

During the ON period of the switching element 40, since the bias supply from the regulator 80 is intercepted, the charge accumulated in the capacitor 100 flows backward via a body diode of the n-type MOSFET 141 in the feedback current detection circuit 140, and is slowly discharged due to consumption of current by the start circuit 120 and the reference voltage circuit 130.

During the OFF period of the switching element 40, that is, when the signal from the oscillator 64 becomes H level, or the output from the SR latch 65 becomes H level, since the NOR gate circuit 66 outputs L level to the gate of the switching element 40, the switching element 40 is turned Off.

When the switching element 40 is switched from the ON period to the OFF period, the drain voltage V6 of the switching element 40 rises, the regulator 80 operates due to the drain voltage V6, and the feedback current I1 passes through the photocoupler 110 and the capacitor 100.

At this time, the feedback current detection circuit 140 detects the feedback current, and the feedback current is inputted to the input terminal 161 in the dead time generation circuit 160. Therefore, the voltage V7 as the output from the dead time generation circuit 160 becomes H level, and the NOR gate 159 outputs L level due to the H level from the dead time generation circuit 160 and the L level from the NOR gate 66.

Since the current does not pass through the current mirror circuits 157 and 158, the current mirror circuits 157 and 158 hold the voltage V3 accumulated in the feedback capacitor 151. Therefore, when the feedback voltage V2 generated from the voltage V3 is higher than the voltage inputted to the non-inverting input terminal (+) of the comparator 61, the comparator 61 outputs L level. Since the NOR gate 66 outputs L level to the gate of the switching element 40 via the buffer circuit 67 due to the L level of the SR latch 65 and the H level from the oscillator 64, the switching element 40 maintains the OFF condition.

In other words, during the dead time period DT, which is the period for quickly charging the power supply voltage V1 of the capacitor 100, which has dropped due to the discharge, until the voltage V1 reaches the predetermined voltage, the feedback current passes through the feedback current detection circuit 140, and the dead time generation circuit 160 operates. Accordingly, since the current signal I3 outputted from the feedback current detection circuit 140 can be prevented from being transmitted to the feedback voltage generation circuit 150, the voltage V3 accumulated in the feedback capacitor 151 in the previous period is held.

When the dead time period DT finishes due to the completion of charging of the capacitor 100, since the feedback current passing through the feedback current detection circuit 140 decreases, the voltage V7 of the dead time generation circuit 160 becomes L level, and the output from the NOR circuit 159 becomes H level.

Accordingly, the switch 152 is turned on, the voltage V3 is generated by generating a voltage drop by the current I5 proportional to the feedback current I1 and the resistor 153, and the feedback voltage signal V2 is generated by the transistor 154, and the resistors 155 and 156. The feedback voltage signal V2 is a comparison reference voltage of the comparator 61 in the PWM control circuit 60, to determine the peak value of the drain current I4 of the switching element 40 in the next cycle.

On the other hand, the energy accumulated in the transformer 10a during the ON period of the switching element 40 is outputted from the secondary winding 30 during the OFF period of the switching element 40, and DC regulated by the rectifying and smoothing circuit 170, and the output voltage VO is supplied to the load 190. The output voltage VO is detected by the output voltage detection circuit 180, and an error voltage value between the detected output voltage VO and the reference voltage is fed back to the primary side of the transformer 10a via the photocoupler 110.

According to the switching power supply according to the embodiment of the present invention, a voltage corresponding to the output voltage is generated by the feedback current detection circuit 140 and the feedback voltage generation circuit 150 based on the voltage of the regulator 80. Since the feedback current detection circuit 140 has the current mirror circuit that detects the feedback current at the predetermined ratio, the feedback current detection circuit 140 can indirectly detect the feedback current passing through the photocoupler 110. Since the voltage from the regulator 80 becomes zero during the ON period of the switching element 40, the feedback voltage generation circuit 150 generates the feedback voltage corresponding to the output signal of the feedback current detection circuit 140 during the OFF period of the switching element 40, and holds the generated feedback voltage during the ON period of the switching element 40. The feedback voltage corresponding to the output voltage can be generated stably by this operation. The PWM control circuit 60 controls the ON/OFF duty of the switching element 40 according to the feedback voltage.

In other word, the feedback current supplied to the photocoupler 110 is formed so as to be supplied directly from the regulator 80, and the output voltage can be easily stabilized by the feedback current detection circuit 140 and the feedback voltage generation circuit 150. Accordingly, the drive winding and the accompanying rectifying and smoothing circuit, which have been required in the conventional switching power supply, are not required. Further, the switching element 40 and the surrounding control circuit can be installed in a three-terminal package. Accordingly, the switching power supply can be made smaller, and produced at a lower cost as compared to the conventional switching power supply.

When the switching element 40 changes from ON to OFF, the charging current for compensating the amount of power discharged to the capacitor 100 flows as the peak current.

That is, though there is a period in which the peak current passing through the capacitor 100, it is so constructed that during the period, the generation operation of the feedback voltage in the feedback voltage generation circuit 150 is controlled by the dead time generation circuit 160. Therefore, the feedback voltage corresponding to the original feedback current can be generated. Accordingly, the output voltage can be accurately controlled to the predetermined value.

The regulator 80 may be connected to the side to which the DC voltage of the primary winding 20 of the transformer 10*a* is inputted, so that the predetermined voltage is generated based on the DC voltage inputted to the primary winding 20 of the transformer 10*a*.

The feedback current detection circuit 140 and the feedback voltage generation circuit 150 are added to the switching power supply in the embodiment, as compared to the control circuit 200 in the conventional switching power supply. However, since these circuits can be formed in a semiconductor integrated circuit, the addition does not become an obstruction to realizing small size and low cost of the switching power supply, and disuse of the drive winding and the rectifying and smoothing circuit largely contributes to realizing small size and low cost of the switching power supply.

EFFECTS OF THE INVENTION

According to the present invention, the feedback current to be supplied to the photocoupler is supplied directly from the regulator, and the output voltage can be easily stabilized by the feedback current detection circuit 140 and the feedback voltage generation circuit 150. Accordingly, the drive winding and the accompanying rectifying and smoothing circuit, which have been required in the conventional switching power supply, are not required. Therefore, it is possible to realize smaller size and lower cost of the switching power supply.

Further, when the switching element changes from ON to OFF, there is generated a period in which the peak current flows to the capacitor. However, since it is constructed such that during this period, the generation operation of the feedback voltage in the feedback voltage generation circuit is controlled by using the dead time generation circuit, the feedback voltage corresponding to the original feedback current can be generated. Accordingly, the output voltage can be accurately controlled to the predetermined value.

INDUSTRIAL APPLICABILITY

The present invention can be applied to switching power supplies, such as a DC-DC converter and an AC-DC converter.

This application claims benefit of priority under 35USC §119 to Japanese Patent Applications No. 2005-062932, filed on Mar. 7, 2005, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A switching power supply comprising:
   a switching element being connected to one end of a primary winding of a transformer, an input DC voltage being supplied to a secondary winding of the transformer via the primary winding;
   an output voltage detection circuit detecting a voltage obtained by rectifying and smoothing a voltage of the secondary winding of the transformer, and generating an error signal based on the detected voltage;
   a regulator generating a predetermined voltage;
   a capacitor being coupled to an output of the regulator and configured to stabilize an output voltage of the regulator;
   a photocoupler being connected to the capacitor in parallel, a feedback current signal corresponding to the error signal passing through the photocoupler;
   a feedback current detection circuit outputting electric current corresponding to the feedback current signal that passes through the photocoupler;
   a feedback voltage generation circuit generating a feedback voltage according to the current outputted from the feedback current detection circuit when the switching element is OFF, and holding the generated feedback voltage when the switching element is ON; and
   a control circuit controlling ON/OFF duty of the switching element according to the feedback voltage outputted from the feedback voltage generation circuit.

2. The switching power supply according to claim 1, wherein the feedback current detection circuit is a current mirror circuit.

3. The switching power supply according to claim 1, wherein the regulator is connected to a side of the primary winding to which the DC voltage of the primary winding of the transformer is input in order, to generate a predetermined voltage based on the DC voltage.

4. The switching power supply according to claim 1, further comprising
   a dead time generation circuit controlling generation operation of the feedback voltage in the feedback voltage generation circuit in a case where a peak current passes through the capacitor due to a change in a state of the switching element from ON to OFF.

5. The switching power supply according to claim 4, wherein
   the output current of the feedback current detection circuit is transmitted to the feedback voltage generation circuit via the dead time generation circuit; and
   the dead time generation circuit intercepts the transmission of the output current of the feedback current detection circuit when the peak current passes through the capacitor due to the change in the state of the switching element from ON to OFF.

6. The switching power supply according to claim 1, wherein the predetermined voltage is based on a voltage generated at a node that is between the switching element and the primary winding of the transformer.

* * * * *